US012429164B2

(12) United States Patent
Walter et al.

(10) Patent No.: US 12,429,164 B2
(45) Date of Patent: Sep. 30, 2025

(54) MONITORING FACILITY AND METHOD FOR MONITORING AN OPENING

(71) Applicant: Siemens Aktiengesellschaft, Munich (DE)

(72) Inventors: Maximilian Walter, Nuremberg (DE); Ulrich Taschke, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 18/372,916

(22) Filed: Sep. 26, 2023

(65) Prior Publication Data

US 2024/0102610 A1 Mar. 28, 2024

(30) Foreign Application Priority Data

Sep. 28, 2022 (EP) .................................. 22198278

(51) Int. Cl.
*F16P 3/14* (2006.01)
*B65G 43/08* (2006.01)
*G01V 8/20* (2006.01)

(52) U.S. Cl.
CPC .............. *F16P 3/144* (2013.01); *B65G 43/08* (2013.01); *G01V 8/20* (2013.01); *B65G 2203/044* (2013.01); *B65G 2207/40* (2013.01)

(58) Field of Classification Search
CPC ............ B65G 43/08; B65G 2203/0225; B65G 2203/0233; B65G 2203/044;
(Continued)

(56) References Cited

U.S. PATENT DOCUMENTS 5,428,279 A * 6/1995 Sugimoto ................ B25J 19/06
318/563
6,737,970 B2 * 5/2004 Wuestefeld ............ F16P 3/144
340/567
(Continued)

FOREIGN PATENT DOCUMENTS

DE 10026305 11/2001
DE 102004038906 3/2006
(Continued)

*Primary Examiner* — Gene O Crawford
*Assistant Examiner* — Keith R Campbell
(74) *Attorney, Agent, or Firm* — Cozen O'Connor

(57) ABSTRACT

Monitoring facility and method for monitoring an opening, wherein to improve the monitoring facility through which objects are channeled via a transportation device, a light curtain includes a transmitter array with transmitters emitting light beams and a receiver array with receivers receiving light beams which recognize interruption of a light beam and provide a signal, where the light curtain is arranged such that the light beams extend orthogonally to a transportation plane of the transportation device, and includes a scanner which scans receiver signals of the light curtain in chronologically consecutive scanning steps and provides each scanned signal as a signal series, a controller unit with a safety program which transmits a shut-off signal to prevent a danger, and an object recognition system arranged opposite to the transportation direction in front of the light curtain which is configured to recognize objects and to derive parameters therefrom for their geometric shape.

6 Claims, 7 Drawing Sheets

(58) Field of Classification Search
CPC ....... B65G 2207/40; G01V 8/20; F16P 3/142; F16P 3/144
See application file for complete search history.

(56) References Cited

U.S. PATENT DOCUMENTS

| | | | | |
|---|---|---|---|---|
| 6,979,814 | B2* | 12/2005 | Kudo | G01V 8/20 250/221 |
| 8,355,581 | B2* | 1/2013 | Noy | G01B 11/24 382/199 |
| 9,171,438 | B2* | 10/2015 | Kikuchi | H03K 17/943 |
| 9,910,186 | B2* | 3/2018 | Stein | G01V 8/20 |
| 2002/0070860 | A1 | 6/2002 | Wuestefeld et al. | |
| 2020/0081123 | A1 | 3/2020 | Pfister | |
| 2024/0401740 | A1* | 12/2024 | Seddik | F16P 3/144 |

FOREIGN PATENT DOCUMENTS

| | | | |
|---|---|---|---|
| DE | 102004038906 A1 * | 3/2006 | ................ F16P 3/14 |
| DE | 102018122263 | 3/2020 | |
| EP | 2108879 | 10/2009 | |
| EP | 3290770 B1 | 4/2019 | |

* cited by examiner

FIG 7
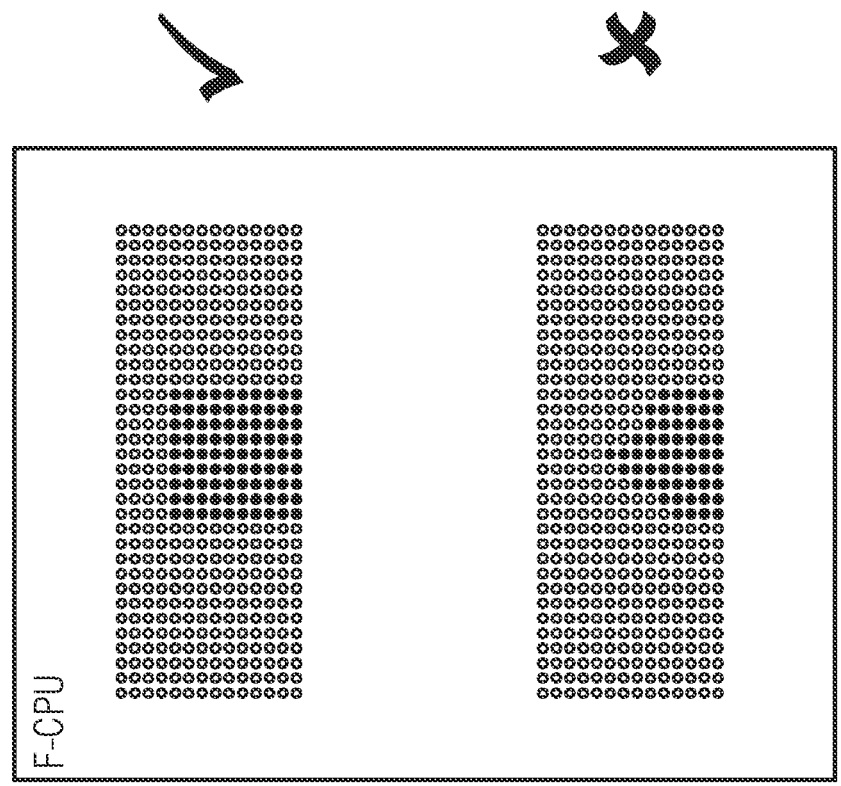
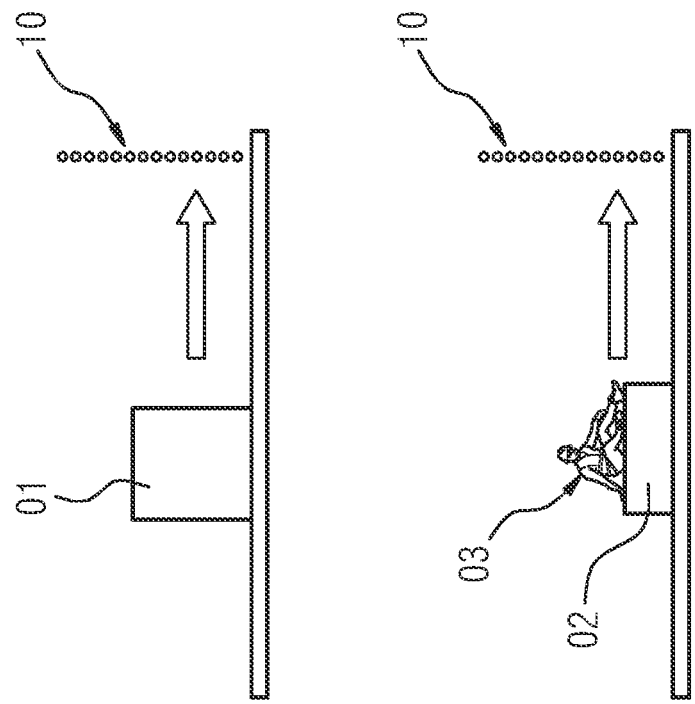

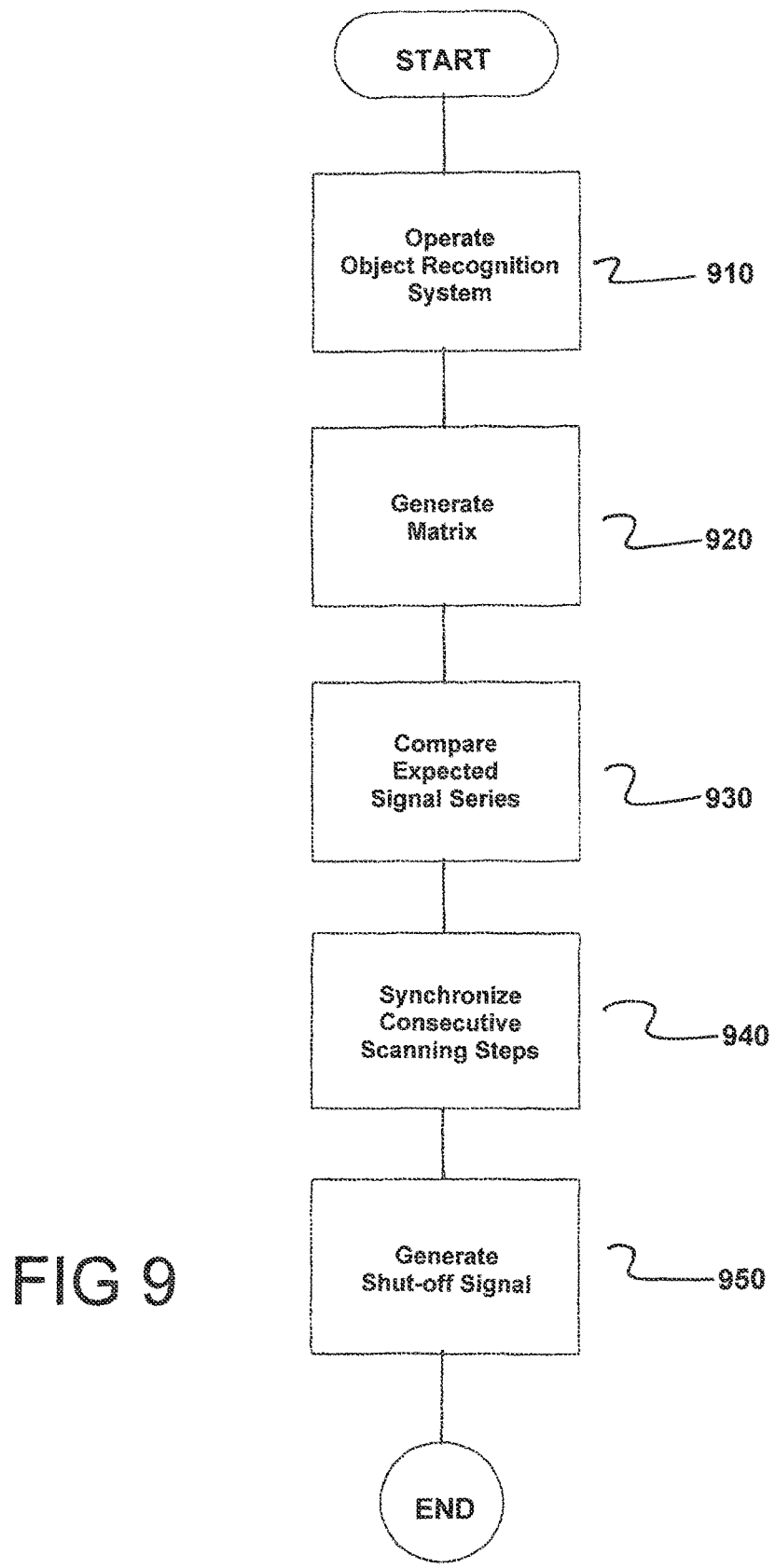

MONITORING FACILITY AND METHOD FOR MONITORING AN OPENING

BACKGROUND OF THE INVENTION

1. Field of the Invention

The invention relates to a monitoring facility for monitoring an opening, through which objects are channeled via a transportation device having a light curtain, comprising a transmitter array with multiple transmitters emitting light beams and a receiver array with multiple receivers receiving light beams which recognize an interruption of a light beam and provide a signal, where the light curtain is arranged at the opening, such that the light beams extend orthogonally to a transportation plane of the transportation device, and further includes a scanner configured to scan the signals of the receivers of the light curtain in chronologically consecutive scanning steps and to provide each scanned signal as a signal series, and a control unit comprising a safety program configured to emit a shut-off signal in order to prevent a dangerous situation from occurring.

2. Description of the Related Art

Potentially dangerous machines, such as presses or fast-moving robot arms, are located in a secure, enclosed area. For example, packages or boxes of any size are to be supplied to the enclosed area through an opening.

Methods and devices are already known in industry for securing passage openings through which particular permissible objects enter a danger zone or exit therefrom, whereas an entry or exit of impermissible objects, in particular of persons, is to be prevented. Applications for this are, for example, access protection of automatic production systems, safeguarding of entrance openings to production lines, securing bending presses and palletizing systems, transportation technology, conveyance and storage technology, the packaging industry, mechanical engineering and the automotive industry.

It is known for such passages or openings to be secured by a light array, in which transmission units arranged in series emit light beams that are received by correspondingly arranged receiving units. An interruption of the light beams signals the passage of an object. If an impermissible object passes through the light array, a safety function, such as an alarm, is triggered, a dangerous production machine is shut off or its speed is slowed down. EP 2 108 879 B1 discloses a corresponding method and a device in which the permissible objects can pass through the secured passage or opening. The disadvantage of this conventional method is that permissible objects must be learned beforehand in a learning step, and in addition the method disclosed in accordance with the prior art has the disadvantage that the objects must be aligned beforehand. In methods that do not work using the modification step, it is a disadvantage that the opening must have exactly the same width as the permissible object in order to prevent person from passing through the light curtain without being noticed, by progressing through the light curtain along with the permissible object.

SUMMARY OF THE INVENTION

It is an object of the invention to provide a method and monitoring facility in which it is not necessary to learn the objects beforehand, i.e., in the case of boxes, for example, boxes of any height, width and length should be able to pass through the opening and be reliably detected.

It is also an object of the invention that the boxes can lie rotated by any angle on a conveyor belt and yet can be reliably recognized.

These and other objects and advantages are achieved in accordance with the invention by a monitoring facility, where an object recognition system is arranged opposite to a direction of transportation in front of a light curtain and which is configured to recognize the objects and to derive parameters therefrom for their geometric shape, and where the safety program has a reconstruction algorithm that is configured to generate from the parameters a matrix containing expected signal series in their chronological order during a passage of the objects through the opening. The safety program further includes a comparison device which is configured to compare column-by-column the expected signal series of the matrix containing the signal series currently being generated during the passage of the object, where each column corresponds to a scanning step, and the safety program is configured to generate the shut-off signal if a deviation is established between the expected signal series and the signal series currently being acquired.

The objects are preferably boxes and the transportation device is preferably a series of belts or rollers that transport the boxes and enable them to pass through the openings that are monitored by a light curtain. The light curtain is arranged such that the light beams extend perpendicularly, as a result of which the shape of a base area of the box or of other objects becomes recognizable for the light curtain. In addition, an image processing unit (image processor) or the object recognition system is installed for the light curtain, and is able to recognize, classify and analyze the objects moving on the belt. The object recognition system or the image processing unit (image processor) and the light curtain then send their data in real time to a functionally safe controller. Based on this information, the controller decides whether The object passing the light curtain is, for example, cuboid. If an invalid object is recognized, then a safe reaction occurs, for example, the drives of a potentially dangerous machine can be shut down.

Safety is further increased if the light curtain is further configured to transmit an individual Boolean signal to the control unit, where the safety program is configured to generate the shut-off signal based on the individual Boolean signal, and where the safety program is further configured such that the generation of the shut-off signal is suppressed if the expected signal series matches the signal series currently being acquired.

The light curtain now transmits an additional individual safety-oriented Boolean signal to the safety controller as soon as at least one light beam is interrupted. Consequently, this signal can already trigger a safe reaction, for example, shutting off the drives. But if, and only if, the signal series from the light curtain or from the receivers of the light curtain matches the expected bits of the expected signal series of the generated matrix, then the triggering safety signal is suppressed, which has the crucial advantage that a box positioned so that one of its edges penetrates the light curtain first does not result in a safe reaction. This has the corresponding advantage that the signal series currently being acquired does not have to be transmitted in a safety-related manner, and the signal series can therefore be transmitted as standard. This in turn has the advantage that the safety-oriented data traffic is reduced. This is because a T-telegram can at present only transmit 13-byte safety data per telegram.

The safety of the monitoring facility is once again improved a further time if it has a further light curtain, where the further light curtain is arranged at the opening such that the light beams extend parallel to the transportation plane.

With the previously described conventional monitoring facility with just one light curtain there is the risk, in particular with large boxes, of a person sitting on one of the boxes. As a result the base area of the object remains square, and the person could enter the protection zone without being noticed. As a solution, in this case, the use of the further light curtain is proposed, this being aligned horizontally with its light beams. This light curtain then analogously sends a time-dependent sensor signal or a time-dependent signal series or a time-dependent bit vector to the failsafe control unit.

The objects and advantages are also achieved in accordance with the invention by a method for monitoring an opening, through which objects are channeled via a transportation device, where light beams are generated in or immediately in front of the opening with a light curtain, a plurality of transmitters of a transmitter array emitting light beams are aligned with a plurality of receivers of a receiver array receiving light beams, where if a light beam is interrupted this interruption is then recognized, and a signal is provided for the respective receiver, where the light curtain is operated in or immediately in front of the opening such that the light beams extends orthogonally to a transportation plane of the transportation device, where with a scanner the signals of the receivers of the light curtain are scanned in chronologically consecutive scanning steps and are provided as a signal series, and where in order to prevent a dangerous situation a shut-off signal is emitted via a control unit with a safety program. With such a method the objects and advantages in accordance with the invention are achieved because an object recognition system is operated opposite to the direction of transportation in front of the light curtain to recognize the objects and to derive therefrom parameters for their geometric shape, where via a reconstruction algorithm a matrix containing expected signal series is generated from the parameters in their chronological order, as they arise during a passage of the objects through the opening. Using a comparison device, the expected signal series are then compared column-by-column of the matrix containing the signal series currently being generated during the passage of the object, where the column-by-column comparison is synchronized with the scanning steps. If a deviation between the expected signal series and the signal series currently being acquired is established, then the shut-off signal is generated. With these methods, it is now possible to recognize objects in a general way, i.e., when boxes are to be transported the boxes can now be of any height, width and length. The boxes can also lie on the belt rotated by any angle.

An object of the object recognition system is, for example, to recognize rectangular objects and in each case to ascertain the following parameters: (i) a center point (cx,cy), (ii) a width and a length (w,l) and (iii) an orientation on the belt ($\alpha$, rotation and z-axis).

A further advantage is that the object recognition system does not necessarily need to be implemented using failsafe technology, because an error in the extraction of the parameters or a failure to recognize an object subsequently results in a safe reaction. This is because the parameters are transmitted to an application which is executed in a safety-oriented manner, for example, on a Siemens F-CPU. This F-CPU uses a corresponding program to reconstruct from the parameters an expected value for the behavior of the light curtain. Specifically, an expected bit matrix is generated, which represents the chronological order of the interruption of the individual light beams. When the object passes through the light curtain this bit matrix is compared column-by-column with the sensor data actually being generated, for example, a field of variables and of the Boolean type, which indicates which light beams are being interrupted. The sensor data need also not be captured or transmitted on a safety-oriented basis, where a non-safety-oriented capture and transmission is sufficient.

Even if a camera, an image recognition and a transmission of the parameters and the individual bits of the light curtain are implemented in a non-safety-oriented manner, then potentially dangerous failures of the overall system cannot occur. This is explained briefly using two examples.

Example 1: The object recognition system or the image recognition fails completely, and does not recognize an object. The object recognition system then also does not supply any parameters to the F-CPU, and an empty bit matrix is generated. The subsequent comparison fails as soon as the object penetrates the light curtain. The Boolean signal of the light curtain is not then ignored, and the safe reaction is initiated.

Example 2: The object recognition system or the image recognition fails because it wrongly recognizes a non-box-shaped object (for example, a person) as a box. In this case it supplies false parameters to the F-CPU. In the F-CPU a rectangular object is generated in the bit matrix. However, this bit matrix does not match the actual object, because according to assumption this is not rectangular. The comparison fails for at least one column, which means the Boolean signal of the light curtain is not ignored. This results in the safe reaction.

For this reason, it is advantageous if the light curtain continues to be operated to transmit an individual Boolean signal to the control unit and, based on the individual Boolean signal to generate the shut-off signal, where if the expected signal series matches the signal series currently being acquired, then the generation of the shut-off signal is suppressed. As a result, a safety-oriented transmission of the signal series can advantageously be dispensed with.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which:

FIGS. 7 and 8 show the principle when using a second light curtain; and

FIG. 9 is a flowchart of the method in accordance with the invention.

DETAILED DESCRIPTION OF THE EXEMPLARY EMBODIMENTS

Figure 1:
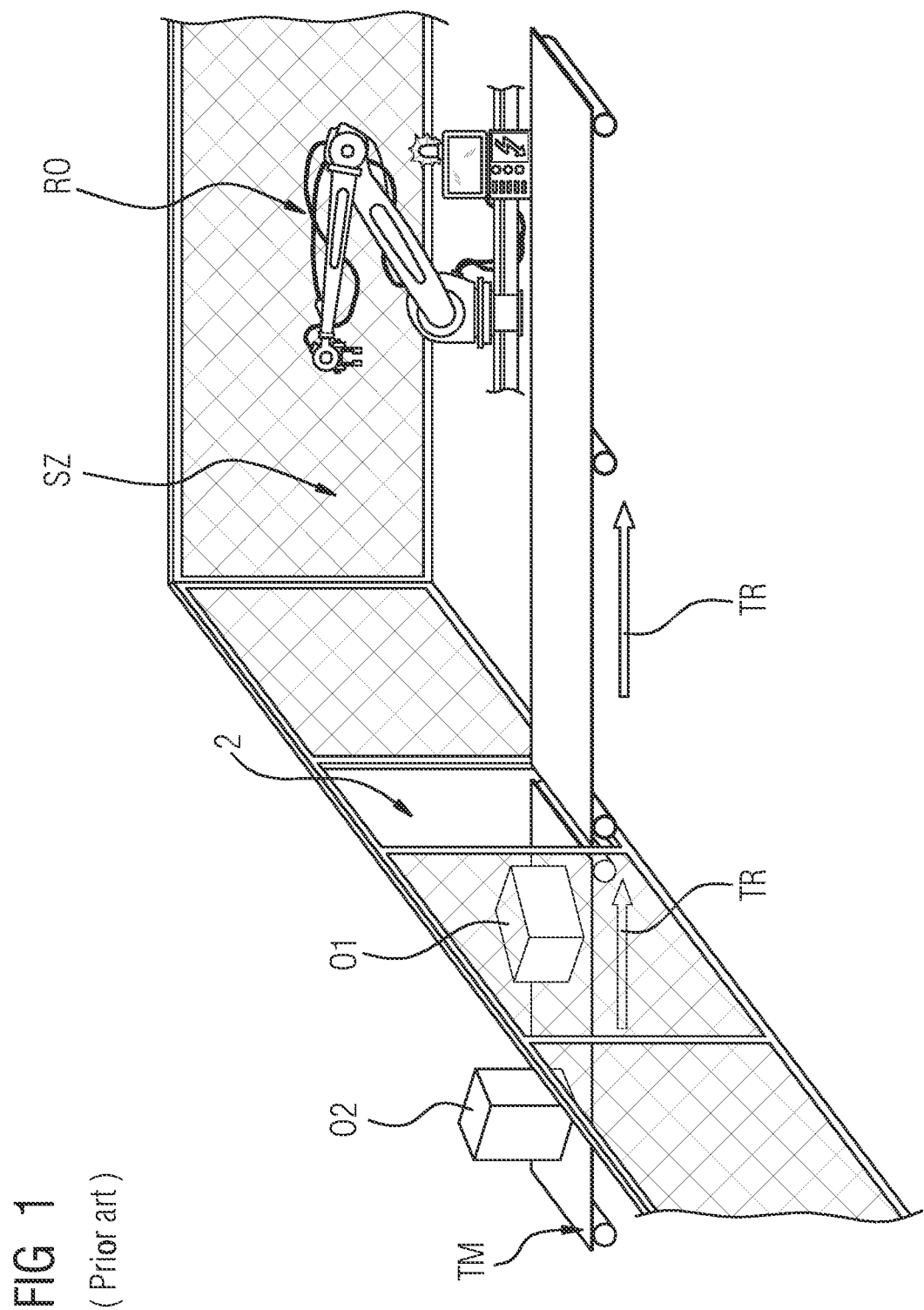
FIG. 1 shows a protection zone in accordance with the prior art.

In accordance with FIG. 1, a robot RO is shown in a protection zone SZ. In the protection zone SZ, objects O1,O2 can be transported via an opening 2 via a transportation device TM in a direction of transportation TR.

The robot RO is a potentially dangerous machine. Accordingly, it must be ensured that only permitted objects O1,O2 may pass through the opening 2 and never a human being. To this end, a monitoring facility with a light curtain is proposed below.

Figure 2:
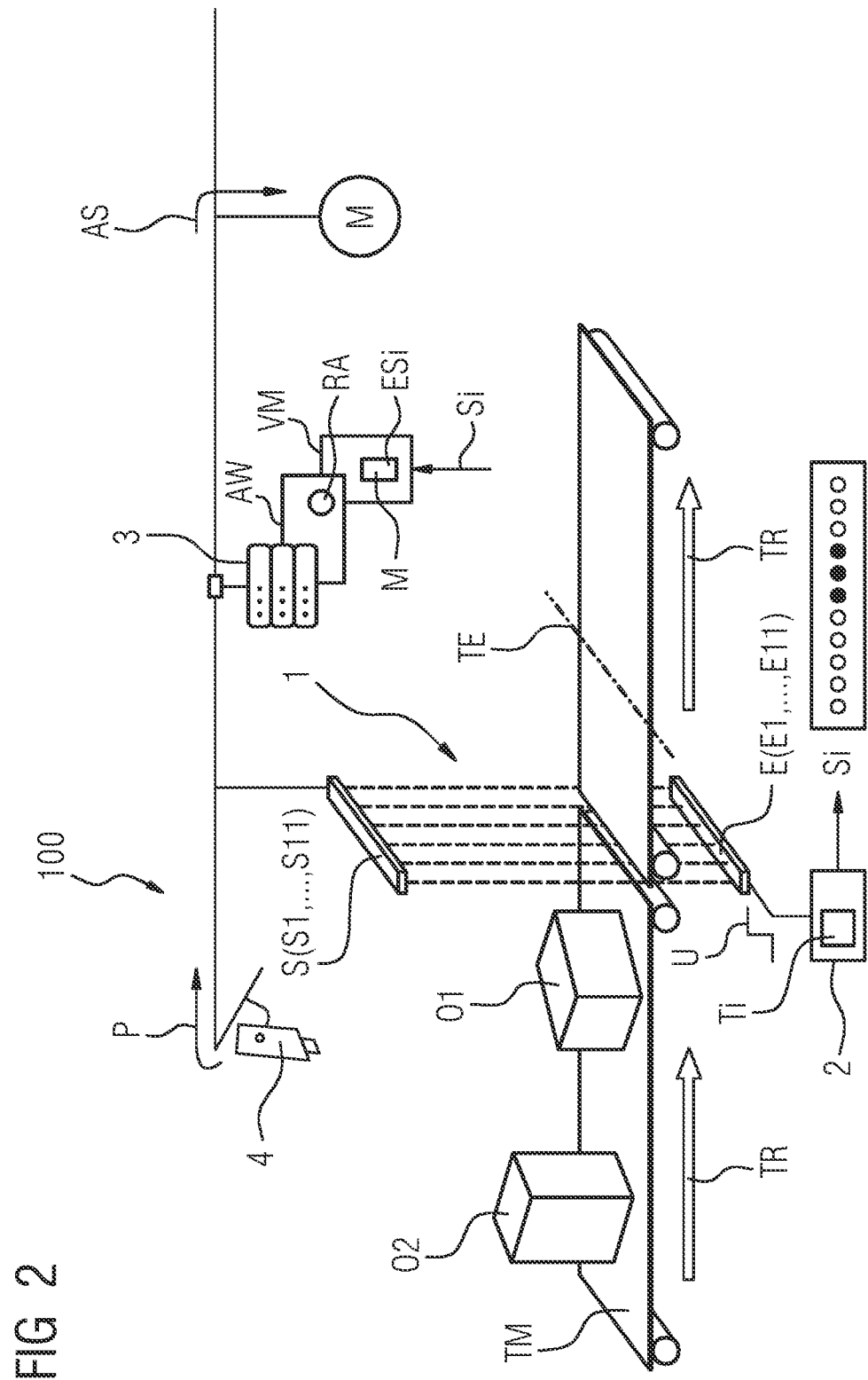
FIG. 2 shows an inventive monitoring facility.

FIG. 2 shows a monitoring facility 100 for monitoring the opening 2, through which a first object O1 and a second object O2 are channeled via the transportation means TM. The opening 2 in accordance with FIG. 1 is now secured with a light curtain 1. The light curtain 1 is arranged such that the light beams extends orthogonally to a transportation plane TE of the transportation device TM. The light curtain 1, to this end, has a transmitter array S containing multiple transmitters S1, . . . ,S11 emitting light beams and a receiver array E containing multiple receivers E1, . . . ,E11 receiving light beams. The receivers E1, . . . ,E11 recognize an interruption of a light beam and generate a signal U.

A scanner 2 is connected to the light curtain 1 and is configured to scan the signals U of the receivers E1, . . . ,E11 of the light curtain 1 in chronologically consecutive scanning steps Ti and to provide each scanned signal as a signal series Si.

A control unit (controller) 3 comprising a safety program AW is configured to emit a shut-off signal AS, in order to prevent a dangerous situation from occurring. For example, a motor M of the conveyor belt is stopped. An object recognition system 4 is arranged in front of the light curtain 1 and is configured to recognize the objects O1,O2 and to derive parameters P therefrom for their geometric shape. The safety program AW of the control unit 3 has a reconstruction algorithm RA which is configured to generate from the parameters P a matrix M containing expected signal series ESi in their chronological order during the passage of the objects O1,O2 through the opening 2. The safety program AW further has a comparison device VM which is configured to compare column n by column n+1 (see FIG. 5 to FIG. 7) the expected signal series ESi of the matrix M with the signal series Si currently being generated during the passage of the object O1, where a column n in each case corresponds to a scanning step Ti.

The safety program AW is configured such that the shut-off signal AS is generated if a deviation is established between the expected signal series ESi and the signal series Si currently being acquired.

Figure 3:
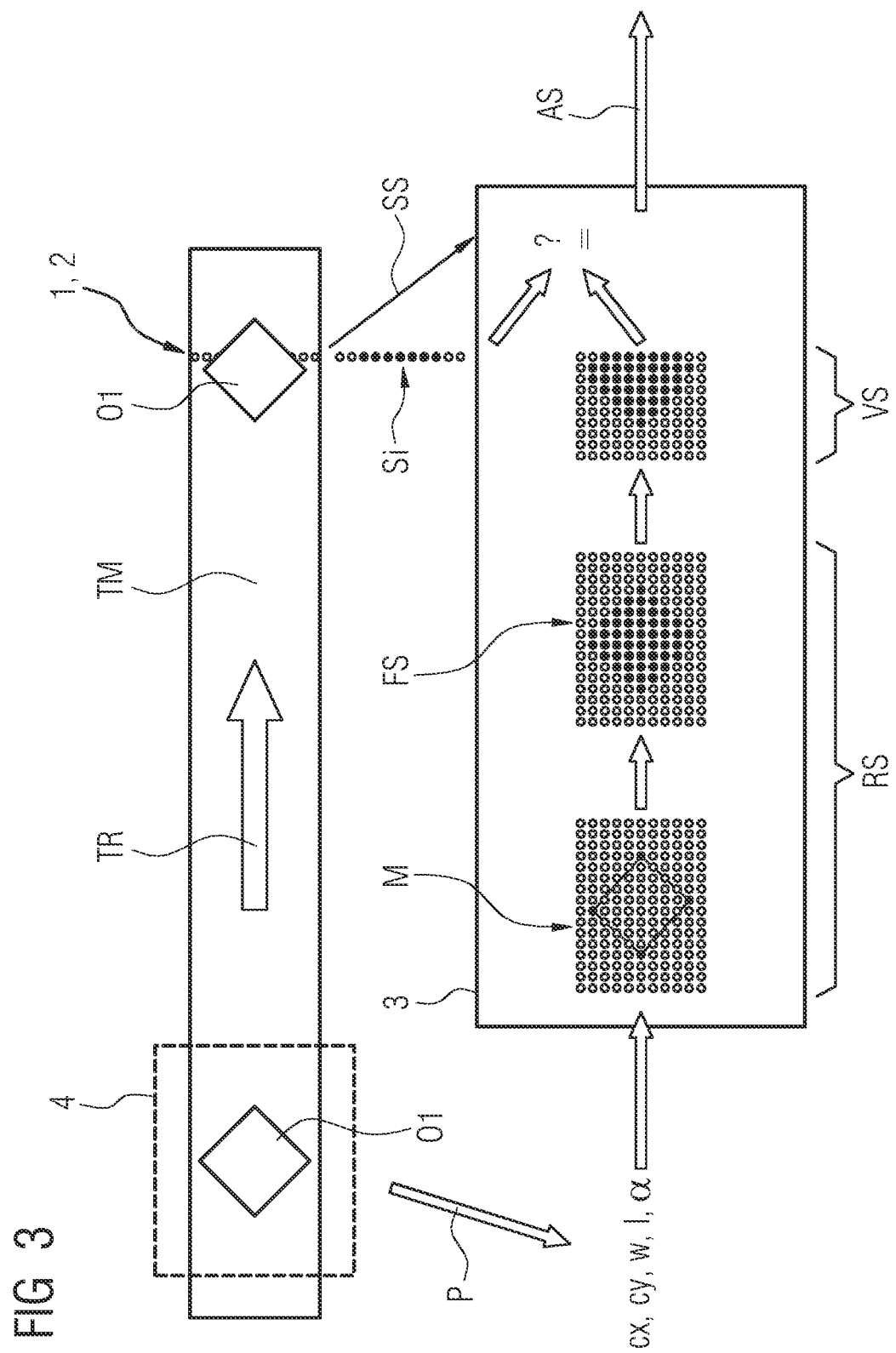
FIG. 3 shows the generation of a matrix containing expected signal series in accordance with the invention.

FIG. 3 shows in a chronological order what the monitoring facility 100 recognizes and reconstructs or then compares. The object recognition system 4 recognizes the first object O1 and sends parameters P, such as center point coordinates cx,cy, a width w, a length l and a rotation about the Z-axis α, which indicates, for example, how a box is oriented on the transportation device TM. The first object O1 now travels further in the direction of transportation TR to the light curtain 1 or to the opening 2. In the time in which the first object O1 travels further, the corners of the object O1 are reconstructed in the control unit 3 from the generated parameters P in a reconstruction step RS initially in a matrix M. Using the reconstructed corners, a size can be ascertained and in a filling step FS, this size is filled in with expected signal series ESi, such as arise in their chronological order during the passage of the objects O1 through the opening 2. In a subsequent comparison step VS, the expected signal series ESi of the matrix M is compared column n by column n+1 with the signal series Si being generated during the current passage of the object O1. In order to increase safety the control unit 3 again emits an individual Boolean signal SS.

This offers the advantage that the signal series need not necessarily be transmitted with a safety protocol. Then in a embodiment there would be a monitoring facility 100 in which the signal series Si are transmitted from the light curtain to the safety controller via a non-secure communication protocol, but additionally an individual Boolean signal SS is transmitted to the control unit 3, where the safety program AW is configured to generate the shut-off signal AS based on the individual Boolean signal SS. Alternatively or in addition, there would be a monitoring facility 100 in which the signal series Si is transmitted from the light curtain to the safety controller via a secure communication protocol.

Figure 4:
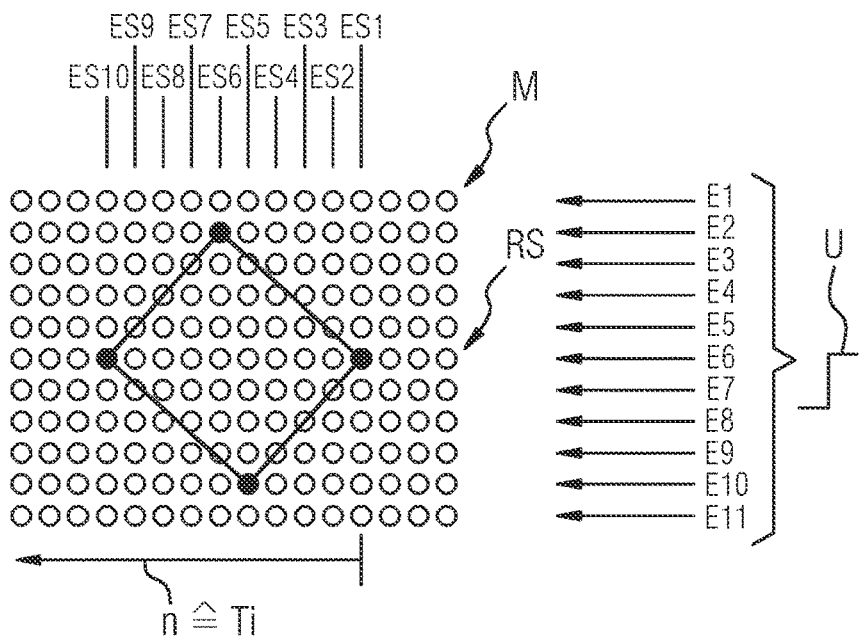
FIGS. 4, 5, 6 show exemplary signal series in a matrix each in accordance with the invention.

FIG. 4 shows the matrix M as generated by the reconstruction algorithm RA. The object recognition system 4 has supplied parameters P for a square, and this corresponds to a box standing on the conveyor belt rotated by 45 degrees. The individual sensors or the receivers E1, . . . ,E11 would generate the signals in accordance with the generated matrix M during the passage of the box through the light curtain 1. Thus the matrix M consists of expected signal series ES1, . . . ,ES10.

Figure 5:
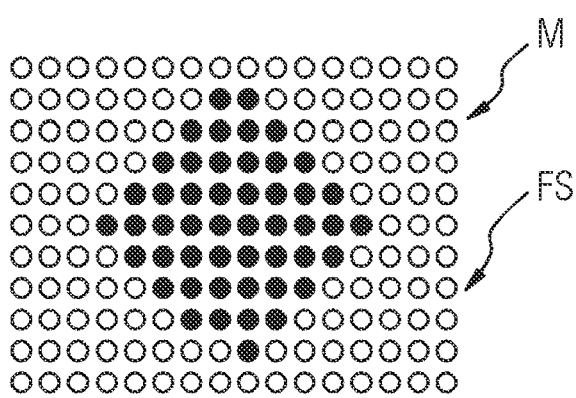

FIG. 5 shows the filling with the expected signal series ES1, . . . ,ES10 by the filling step FS.

Figure 6:
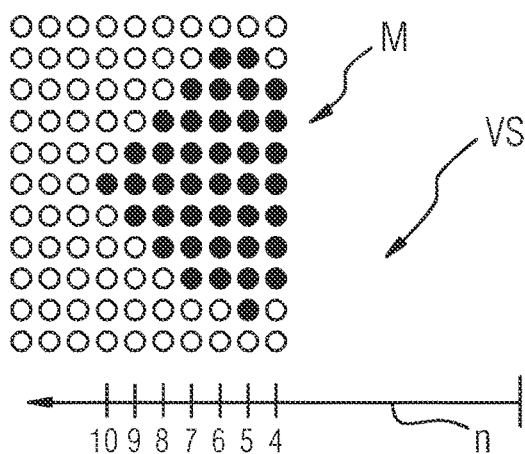

FIG. 6 shows the chronological consecutive processing of the signal series ES1, . . . ,ES10 for a comparison of the expected signal series ESi with the signal series ESi actually generated.

Figure 8:
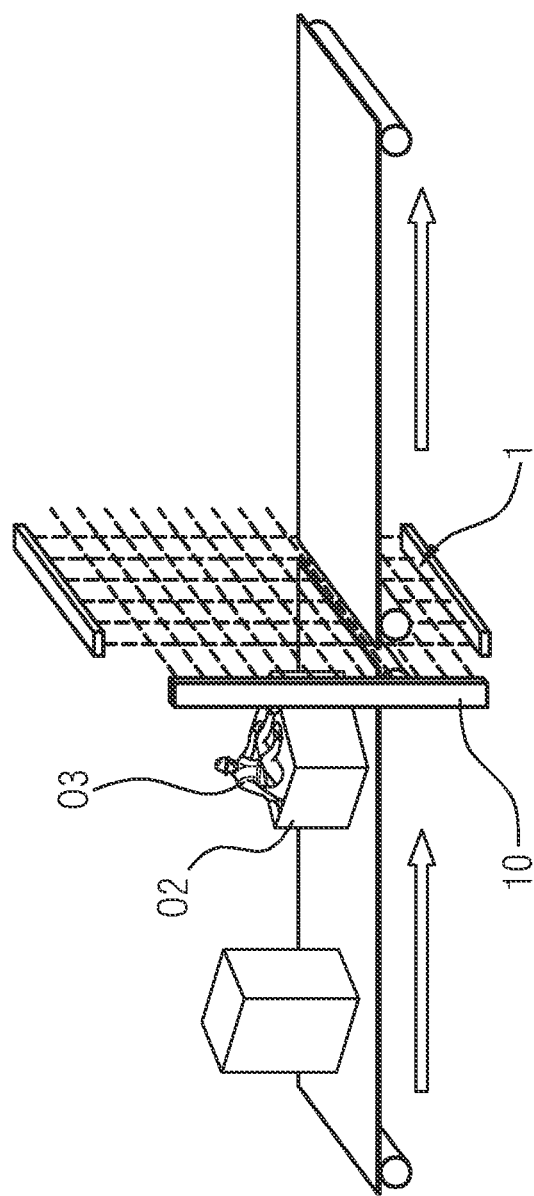

FIG. 7 illustrates a special case for especially large boxes, because a third object O3 is sitting on a large box, in the presently illustrated example a second object O2, and the third object O3 is a human being, which may result in a dangerous situation. In order to prevent this, a further light curtain 10 is evaluated, which works on the same principle as the first light curtain 1. With a light curtain 1 only the base area of the large box can be reliably recognized and because human beings could hide on large boxes. Consequently, even a human being on a large box can be recognized with the second light curtain. This is shown once again symbolically with FIG. 8.

FIG. 9 is a flowchart of the method for monitoring an opening 2, through which objects O1,O2,O3 are channeled via a transportation device TM, where light beams are generated in or immediately in front of the opening 2 via a light curtain 1, a plurality of transmitters S1, . . . ,S11 of a transmitter array S emitting light beams are oriented toward a plurality of receivers E1, . . . ,E11 of a receiver array E which receive the emitted light beams, in an event of an interruption of a light beam the interruption is recognized and a signal U is provided for the respective receiver E1, . . . ,E11, the light curtain 1 is operated in or immediately in front of the opening 2 such that the light beams extend orthogonally to the transportation plane TE of the transportation device TM, the signals U of the plurality of receivers E1, . . . ,E11 of the light curtain 1 are scanned in chronologically consecutive scanning steps Ti utilizing a scanner 2 and are provided as a signal series Si, and a shut-off signal AS is emitted via a control unit 3 with a safety program AW to prevent a dangerous situation from occurring.

The method comprises operating an object recognition system 4 located opposite to a direction of transportation TR in front of the light curtain 1 to recognize the objects O1,O2,O3 and derive parameters P associated with a geometric shape of the objects O1,O2,O3 therefrom, as indicated in step 910.

Next, a matrix M containing a chronological order of expected signal series ESi is generated, via a reconstruction algorithm RA, from the parameters P which arise during passage of the objects O1,O2,O3 through the opening 1, as indicated in step 920.

Next, a comparison device VM is utilized to compare the expected signal series ESi column n by column n+1 of the generated matrix M with the signal series Si currently being generated during passage of the object O1,O2,O3 through the opening 1, as expected in step 930.

Next, the column by column comparison is synchronized with the chronologically consecutive scanning steps Ti, as indicated in step 940. Next, the shut-off signal is generated if a deviation between the expected signal series ESi and the signal series currently being acquired Si is established, as indicated in step 950.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A monitoring facility for monitoring an opening, through which objects are channeled via a transportation device, comprising:
    a light curtain comprising:
        a transmitter array including a plurality of transmitters emitting light beams and
        a receiver array including a plurality of receivers receiving the emitted light beams, said plurality of receivers recognizing an interruption of a light beam and providing a signal, and the light curtain being arranged at the opening such that the light beams extend orthogonally to a transportation plane of the transportation device;
    a scanner configured to scan the signals of the plurality of receivers of the light curtain in chronologically consecutive scanning steps and to provide each scanned signal as a signal series;
    a control unit comprising a safety program configured to emit a shut-off signal to prevent a dangerous situation; and
    an object recognition system arranged opposite to a direction of transportation in front of the light curtain, said object recognition system being configured to recognize the objects and to derive parameters associated with a geometric shape of the objects therefrom;
    wherein the safety program includes a reconstruction algorithm which is configured to generate a matrix containing a chronological order of expected signal series from the parameters during passage of the objects through the opening;
    wherein the safety program includes a comparison stage which is configured to compare column by column the expected signal series of the matrix with the signal series currently being generated during passage of the object through the opening, each column corresponding to a scanning step; and
    wherein the safety program is configured such that the shut-off signal is generated if a deviation is established between the expected signal series and the signal series currently being acquired.

2. The monitoring facility as claimed in claim 1, wherein the light curtain is further configured to transmit an individual Boolean signal to the control unit;
    wherein the safety program is configured to generate the shut-off signal based on the individual Boolean signal; and
    wherein the safety program is further configured to suppress the generation of the shut-off signal if the expected signal series matches the signal series currently being acquired.

3. The monitoring facility as claimed in claim 1, further comprising:
    a further light curtain arranged at the opening such that the light beams extend parallel to the transportation plane.

4. The monitoring facility as claimed in claim 2, further comprising:
    a further light curtain arranged at the opening such that the light beams extend parallel to the transportation plane.

5. A method for monitoring an opening through which objects are channeled via a transportation device, light beams being generated in or immediately in front of the opening via a light curtain, a plurality of transmitters of a transmitter array emitting light beams being oriented toward a plurality of receivers of a receiver array which receive the emitted light beams, in an event of an interruption of a light beam said interruption being recognized and a signal being provided for the respective receiver, the light curtain being operated in or immediately in front of the opening such that the light beams extend orthogonally to a transportation plane of the transportation device, the signals of the plurality of receivers of the light curtain being scanned in chronologically consecutive scanning steps utilizing a scanner and being provided as a signal series, and a shut-off signal being emitted via a control unit with a safety program to prevent a dangerous situation, the method comprising:
    operating an object recognition system located opposite to a direction of transportation in front of the light curtain to recognize the objects and derive parameters associated with a geometric shape of the objects therefrom;
    generating, via a reconstruction algorithm, a matrix containing a chronological order of expected signal series from the parameters which arise during passage of the objects through the opening;
    comparing, utilizing a comparison device, the expected signal series column by column of the generated matrix with the signal series currently being generated during passage of the object through the opening;
    synchronizing the column by column comparison with the chronologically consecutive scanning steps; and generating the shut-off signal if a deviation between the expected signal series and the signal series currently being acquired is established.

6. The method as claimed in claim 5, wherein the light curtain is further operated to transmit an individual Boolean signal to the control unit and based on the individual Boolean signal to generate the shut-off signal; and wherein generation of the shut-off signal is suppressed if the expected signal series matches the signal series currently being acquired.

* * * * *